Nov. 2, 1926.                                                         1,604,977
S. A. CRONE
SELF LOCKING PIN OR BOLT
Filed Jan. 12, 1926                    2 Sheets-Sheet 1
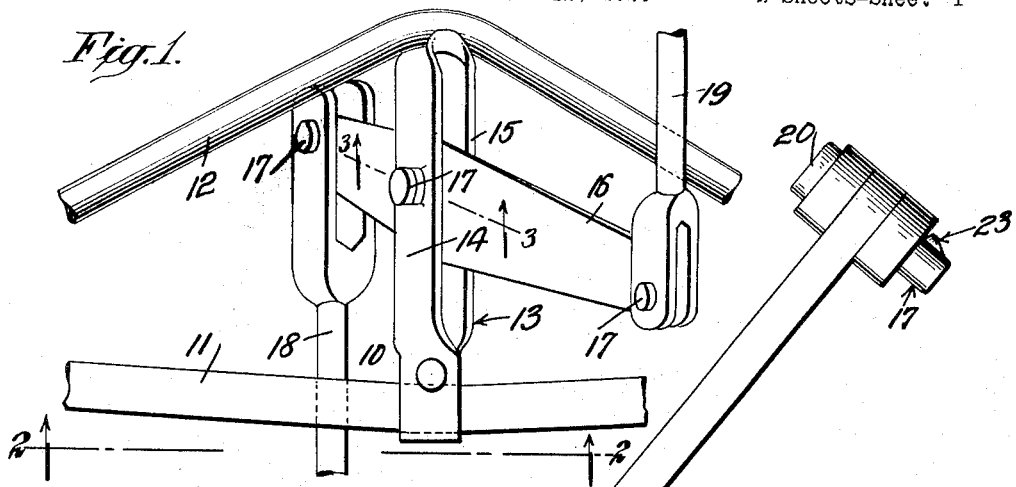
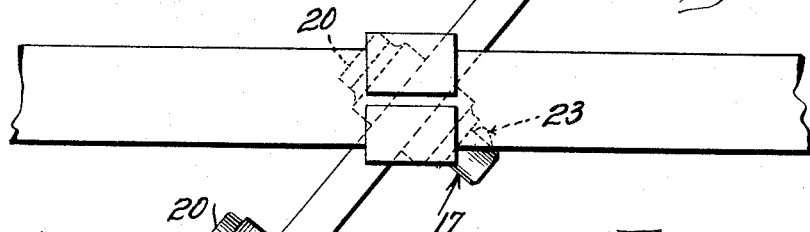
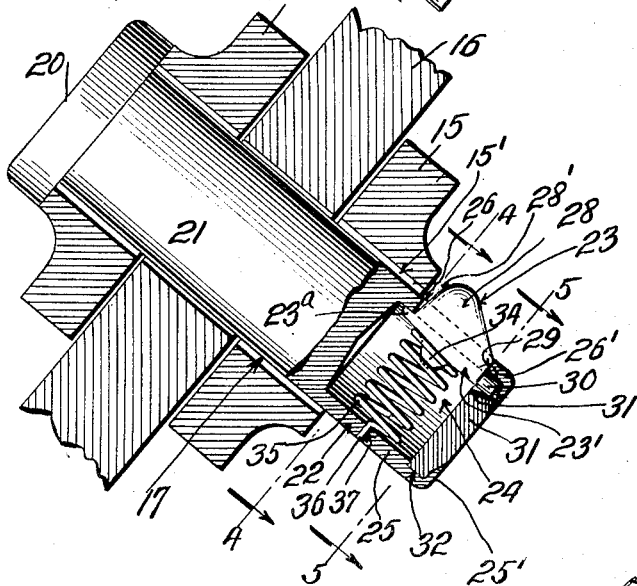
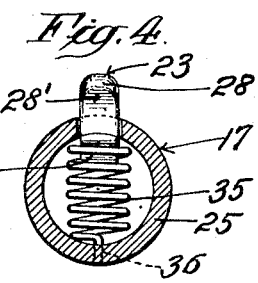
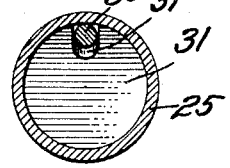
INVENTOR
SETH A. CRONE
BY
Joseph F. O'Brien
His ATTORNEY Nov. 2, 1926.

S. A. CRONE 1,604,977

SELF LOCKING PIN OR BOLT

Filed Jan. 12, 1926

INVENTOR
SETH A. CRONE
BY
Joseph F. O'Brien
his ATTORNEY

Patented Nov. 2, 1926.

1,604,977

UNITED STATES PATENT OFFICE.

SETH A. CRONE, OF EAST ORANGE, NEW JERSEY, ASSIGNOR TO BUFFALO BRAKE BEAM COMPANY, A CORPORATION OF NEW YORK.

SELF-LOCKING PIN OR BOLT.

Application filed January 12, 1926. Serial No. 80,711.

This invention relates to improvements in self locking pins or bolts for railway brake beam lever connections and like devices and constitutes an improvement upon the device shown and described in my co-pending application, Serial No. 56,906, dated September 17, 1925.

One of the objects of my present invention is to eliminate the use and avoid the necessity of the pivot pin on which the pawl, in devices of this character, is usually mounted.

Another object of my invention is to provide a fulcrum mounting for the pawl preferably comprising the provision on the pawl of a fulcrum extension or toe and the provision in the cap of a notch within which said fulcrum extension or toe rocks.

Another object of this invention is to provide, in a device having an axially-disposed pawl housing and a closure therefor, a more positive fastening for the cap employed to close the end of said housing.

Another object of the invention is to provide simple anchoring means for the spring.

Still another object of my invention is to reduce the length of the pawl housing and consequently to reduce the length of the pin or bolt, and thus to increase the rigidity and strength of the device.

Another object of my invention is to utilize a pawl so mounted in an axial pawl-housing as to have contacts with the interior of said housing at opposite sides of a side aperture through which it projects when in operative position so as to produce a positive retention thereof which will prevent any possibility of the pawl being forced through said side opening, and I also preferably utilize such a pawl in combination with an isolated side aperture through the wall of said housing.

Another object of the invention is to utilize an integral portion of the wall of the housing for fastening the cap and producing a pinless connection between the housing and the cap, this connection preferably comprising the spinning of the annular edge of the housing over the perimetrical edge of the cap.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a perspective view, partly broken away, of a truss brake beam including self-locking pins embodying my invention;

Fig. 2 is a section on the line 2—2 of Fig. 1, looking in the direction of the arrow, showing the major part of the device in bottom plan;

Fig. 3 is a section on the line 3—3 of Fig. 1, looking in the direction of the arrow;

Fig. 4 is a section on the line 4—4 of Fig. 3 looking in the direction of the arrow;

Fig. 5 is a section on the line 5—5 of Fig. 3, looking in the direction of the arrow;

Figure 6:
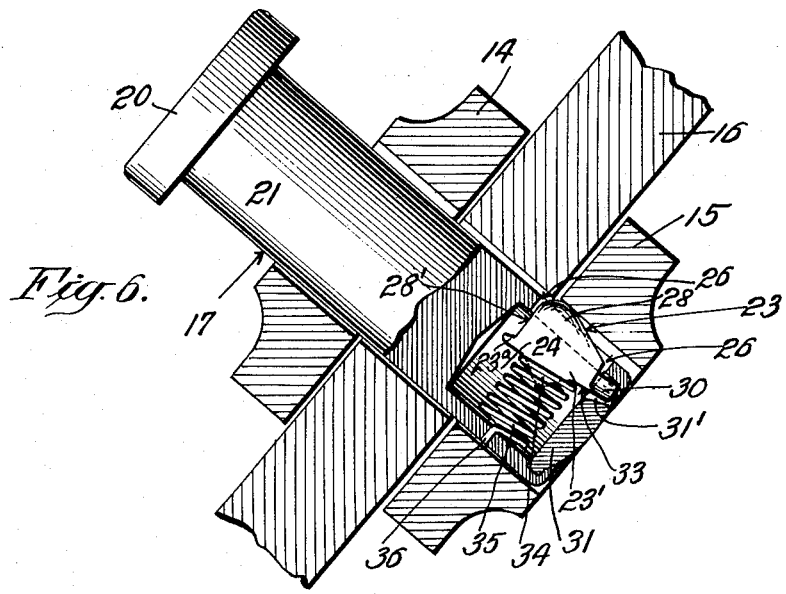
Figure 7:
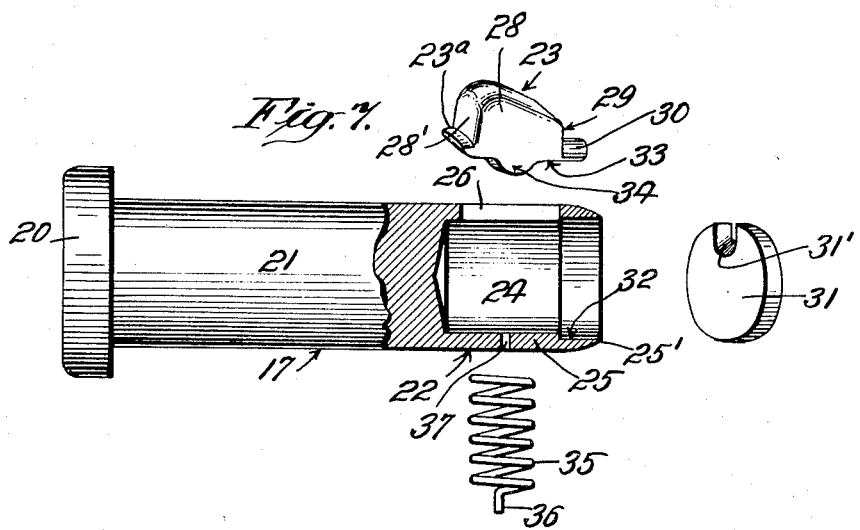

Fig. 6 is a sectional view similar to Fig. 3 showing a pin partially withdrawn or retracted from registering apertures in the lever and mounting members of a truss brake beam; and Fig. 7 is a side elevation, partially in section, of the parts of my self-locking pin in separated condition before assembly and the spinning over of the edges of the pawl housing to confine the pawl cap and spring within said housing.

Referring now to these drawings, 10 indicates a portion of a truss brake-beam embodying a compression member 11, a tension member 12, and a strut 13 between the side members 14 and 15 of which a brake-lever 16 is mounted on a pin 17, said lever being, as shown, also connected at opposite ends with reversely-extending connecting rods 18 and 19 respectively by means of similar pins 17. Each of said pins has a head 20, a solid shank 21 and an extension end-portion 22 arranged to project beyond the brake-beam members connected by the shank and provided with a self-locking pawl 23.

In accordance with my present invention the said extension end portion 22 is provided with an axial bore 24 of reduced length and preferably of less diameter than the pin so as to leave a continuous peripheral wall 25 of suitable thickness about said axial bore. This bore forms a housing for the self-locking pawl 23 and, as shown, is pierced by an aperture or window 26 completely surrounded by the peripheral wall 25 which is thus maintained in substantially unweakened condition at the insertion end, and enables the extension portion to have relatively great rigidity.

As illustrated, the isolated pierced aperture or window 26 is of less length than the length of the bore and extension portion so that a continuous and unbroken peripheral wall at the end of the pin will be provided.

The pawl 23, as illustrated, comprises a body portion 23' of greater length than the aperture 26 and is provided with a projecting portion 28 preferably of a size and shape substantially filling and having its sides registering in operative position, with the edges of the aperture 26. Said projection extends outwardly through the aperture 26 and the top surface 28' is adapted to engage the edge of the aperture or bore 15' through the adjacent brake beam member 15 so as to lock such brake-beam parts together. The opposite bottom end of the pawl is also preferably provided with an elbow 29 formed between the projecting portion 28 and an integral fulcrum projection or toe 30 formed on the base or bottom end of the pawl within the housing. Said elbow 29 is adapted to rest on the bottom edge or sill portion 26' of the aperture 26 and to provide a stop or abutment to prevent downward movement of the pawl when the same is in operative position and in locking engagement with the adjacent member of the said brake-beam parts.

The integral fulcrum projection or toe 30 which, as above stated, is provided at one end of the pawl projection 28. is adapted when the pawl is in mounted position to abut at one side against the inner surface of the housing and to extend into a fulcrum notch 31' formed in a closure or cap 31 which, in the preferred embodiment shown, is adapted to seat within an annular seat 32 formed near the outer end of the axial bore 24, and to be fastened in place therein.

The top end of the pawl also has formed within the housing a top projection 23ª which forms an extension of the body portion 23' of the pawl and forms with the fulcrum projection 30, pawl portions which extend to opposite sides of the window or aperture 26 and prevent outward movement of the pawl through such aperture, it being understood that the pawl in mounting, is inserted axially through the axial bore and then has its nose or projection moved through the window and properly positioned before the closure of the end of the bore by the said cap.

The said cap, in the preferred embodiment shown, is fastened by fastening means integral with the pin or bolt and, as illustrated, said cap is so fastened by inserting the cap within said seat 32 and spinning the bottom edges 25' of the housing wall 25 over the perimetrical edge of the said cap, thus effectively fastening the cap in place and simultaneously mounting the pawl by fixing in position the pawl-mounting notch 31' thereof and also completely closing the bottom of said notch and effectively sealing the interior of the housing or bore from dampness and other weather factors.

The inner surface 33 of the body portion of the pawl is preferably provided with an inward projection 34 and a spiral spring 35 is preferably interposed between said inner surface of the body portion and the inner surface of the wall of said housing. As illustrated, one end of this spiral spring 35 fits over the said projection 34 while the opposite end of the spring is preferably bent to provide a centrally-disposed prong 36 which is anchored, as illustrated, in a hole 37 formed in the wall 25 of the said housing opposite to the pawl, said prong 36 preferably completely filling said hole 37 so as to close the same.

It will be seen that when the spring and pawl are so confined, neither can escape and because of the fact that the pawl is larger in at least two opposite dimensions than the aperture or window through the side of the housing, it will be impossible for the pawl to be forced through said aperture irrespective of its mounting within the cap. It will be seen, furthermore, that the fixing of the cap will position the pawl so that it may be rocked on its fulcrum or toe 30; that I thus form an integral fulcrum on the pawl and a fulcrum mounting on a part of the housing, to wit, in the cap; that by this arrangement I am enabled to completely eliminate pivot pins or the like which at times become corroded or loosened and drop out and that by the use of my invention I provide integral means for fastening the cap which effectively seals the housing to prevent deterioration from dampness and the like and permanently fastens the cap and pawl and spring in place within this housing.

Having described my invention, I claim:—

1. A self locking pin for railway brake beam lever connections and the like, embodying a solid shank portion provided at one end with a head and having at its opposite end an extension portion provided with an axial bore to form a pawl housing, the wall of said housing having an aperture spaced from the insertion end of the pin, a pawl mounted within said housing and having a portion projecting through said aperture, the mounting means for said pawl being completely enclosed within said housing to protect the same from the weather, a spring also enclosed within said housing for forcing said projecting portion of the pawl through said aperture, and means for closing the end of said axial bore.

2. A self locking pin for railway brake beam lever connections and the like, embodying a solid shank portion provided at one end with a head and having at its opposite end an extension portion provided with an axial bore to form a pawl housing, the wall of said housing having an aperture spaced from the insertion end of the pin, a pawl mounted within said housing comprising a body portion abutting against the inner surface of said housing on two opposite sides of said aperture and a portion projecting through said aperture, a spring within said housing for forcing said projecting portion of the pawl through said aperture and the body portion into abutment with said housing and means for closing the end of said axial bore.

3. A self locking pin for railway brake beam lever connections and the like, embodying a solid shank portion provided at one end with a head and having at its opposite end an extension portion provided with an axial bore to form a pawl housing, the wall of said housing having an aperture spaced from the insertion end of the pin, a pawl mounted within said housing and having an operating portion projecting through said aperture, and also having within said housing a fulcrum integral with the pawl, means for mounting said fulcrum to permit rocking of the pawl about said fulcrum, a spring also enclosed within said housing for forcing said operating projecting portion of the pawl through said aperture and means for closing the end of said axial bore.

4. A self locking pin for railway brake beam lever connections and the like, embodying a solid shank portion provided at one end with a head and having at its opposite end an extension portion provided with an axial bore to form a pawl housing, the wall of said housing having an aperture spaced from the insertion end of the pin, a pawl mounted within said housing and having a portion projecting through said aperture, mounting means for said pawl embodying a fulcrum portion integral with the pawl and a notch in a member fixedly arranged within said housing, a spring also enclosed within said housing for forcing said operating projecting portion of the pawl through said aperture, and means for closing the end of said axial bore.

5. A self locking pin for railway brake beam lever connections and the like, embodying a solid shank portion provided at one end with a head and having at its opposite end an extension portion provided with a dead-end axial bore to form a housing, said housing having a wall provided with an aperture, a pawl mounted within said housing and having a portion projecting through said aperture, a spring for forcing said operating portion of the pawl to normally project through said aperture, a cap for closing the end of said bore, and means integral with the housing wall for fastening said cap at the end of said bore.

6. A self locking pin for railway brake beam lever connections and the like, embodying a solid shank portion provided at one end with a head and having at its opposite end an extension portion provided with a dead-end axial bore to form a housing, said housing having a wall provided with an aperture, a pawl mounted within said housing and having an operating portion projecting through said aperture, a spring for forcing said operating portion of the pawl to normally project through said aperture, a cap for closing the end of said bore, and means for fastening said cap comprising a seat for said cap in the wall of the housing and an integral annular flange at the end of said housing wall bent over the edge of said cap to fasten the same in place within said seat.

7. A self locking pin for railway brake beam lever connections and the like, embodying a solid shank portion provided at one end with a head and having at its opposite end an extension portion provided with a dead-end axial bore to form a housing, said housing having a wall provided with an aperture, a pawl mounted within said housing, having a portion projecting through said aperture and also provided with an integral fulcrum projection, a spring for forcing said operating portion of the pawl to normally project through said aperture, and a cap for closing the end of said bore and having a notch within which said fulcrum projection is confined.

8. A self locking pin for railway brake beam lever connections and the like, embodying a solid shank portion provided at one end with a head and having at its opposite end an extension portion provided with a dead-end axial bore to form a housing, said housing having a wall provided with an aperture, a pawl mounted within said housing, having a portion projecting through said aperture and also provided with an integral fulcrum projection, a spring for forcing said operating portion of the pawl to normally project through said aperture, a cap for closing the end of said bore and having a notch within which said fulcrum projection is confined and a flange integral with the housing for fastening said cap and closing said notch.

In witness whereof, I have signed my name to the foregoing specification.

SETH A. CRONE.